United States Patent
Lewis et al.

(10) Patent No.: US 9,230,336 B2
(45) Date of Patent: Jan. 5, 2016

(54) VIDEO SURVEILLANCE

(75) Inventors: Gareth John Lewis, Hook (GB); Michael John Williams, Winchester (GB)

(73) Assignee: SONY CORPORATION, Tokyo (JP)

( * ) Notice: Subject to any disclaimer, the term of this patent is extended or adjusted under 35 U.S.C. 154(b) by 908 days.

(21) Appl. No.: 13/242,848

(22) Filed: Sep. 23, 2011

(65) Prior Publication Data

US 2012/0120241 A1  May 17, 2012

(30) Foreign Application Priority Data

Nov. 12, 2010 (GB) .................................. 1019153.4

(51) Int. Cl.
*H04N 7/18* (2006.01)
*G06T 7/20* (2006.01)

(52) U.S. Cl.
CPC ..... *G06T 7/2093* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 2002/0196330 A1* | 12/2002 | Park et al. | 348/49 |
| 2006/0126738 A1* | 6/2006 | Boice et al. | 375/240.16 |
| 2008/0126031 A1* | 5/2008 | Azarbayejani et al. | 703/2 |
| 2010/0134627 A1 | 6/2010 | Yen et al. | |
| 2010/0157064 A1 | 6/2010 | Cheng et al. | |
| 2010/0201787 A1* | 8/2010 | Zehavi | 348/48 |

FOREIGN PATENT DOCUMENTS

| | | |
|---|---|---|
| JP | 2009-17416 | 1/2009 |
| WO | WO 2010/116969 A1 | 10/2010 |

OTHER PUBLICATIONS

Search Report issued Mar. 8, 2011 in United Kingdom Application No. GB1019153.4 filed on Nov. 12, 2010.
Extended European Search Report issued Sep. 20, 2013 in Patent Application No. 11 182 243.3.

* cited by examiner

*Primary Examiner* — Kate Luo
(74) *Attorney, Agent, or Firm* — Oblon, McClelland, Maier & Neustadt, L.L.P.

(57) ABSTRACT

A video surveillance system comprises two or more video cameras each providing a video signal, the cameras each being positioned at a respective known location; a motion detector to detect image motion of an image feature within the field of view of one of the video cameras and for deriving a corresponding physical motion of an object represented by the image feature; and a motion predictor to predict the physical motion of the object with respect to the known locations of the cameras so as to derive an expected time when the object may be observed in the field of view of another one of the video cameras, in which the motion predictor is responsive to routing data defining possible routes from the observed location of the object to the field of view of another of the cameras.

12 Claims, 14 Drawing Sheets

VIDEO SURVEILLANCE

BACKGROUND OF THE INVENTION

1. Field of the Invention

This invention relates to video surveillance.

2. Description of the Prior Art

Video surveillance systems generally use video cameras at fixed spatial positions to generate video signals representing a scene under surveillance.

This type of system generates a large amount of video data, particularly when multiple cameras are used. Previously, two main solutions have been used to deal with this quantity of data.

One solution is to store everything, which is to say that the video signal from each of the cameras is stored, generally in a rolling storage arrangement holding (for example) the preceding seven days of material. This means that video material relating to an incident can be obtained from the stored material, if the incident is discovered before the storage medium is overwritten by more recent video material.

Another solution is to have a human operator view one or more video displays in real time, watching for incidents or other points of interest.

It is an object of the present invention to provide improved techniques for video surveillance.

SUMMARY OF THE INVENTION

This invention provides a video surveillance system comprising:

two or more video cameras each providing a video signal, the cameras each being positioned at a respective known location;

a motion detector for detecting image motion of an image feature within the field of view of one of the video cameras and for deriving a corresponding physical motion of an object represented by the image feature; and a motion predictor for predicting the physical motion of the object with respect to the known locations of the cameras so as to derive an expected time when the object may be observed in the field of view of another one of the video cameras;

in which the motion predictor is responsive to routing data defining possible routes from the observed location of the object to the field of view of another of the cameras.

The invention recognises that if an image of an object of interest is captured by a surveillance camera, it could be extremely useful to be able to estimate when and where the same object (for example, a criminal, or a runaway child) might be seen on another camera. This information could be used to build up knowledge of the overall movements of the object of interest.

The invention elegantly derives predicted times at which an object may be expected to be seen in the field of view of another camera from an estimate of the object speed and the known locations of the two cameras.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
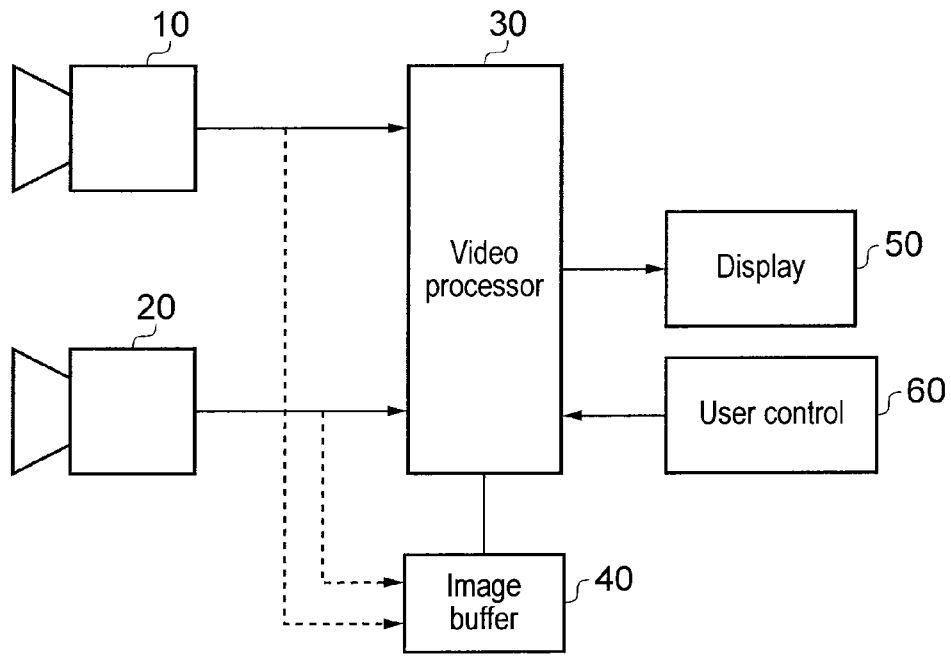
FIG. 1 is a schematic diagram of a video surveillance system.

Referring now to FIG. 1, a video surveillance system comprises two video cameras 10 (though in general, two or more video cameras each providing a video signal and each being positioned at a respective known location may be used), 20; a video processor 30; an image buffer 40; a display 50 and a user control 60.

The video cameras 10, 20 supply video signals to the video processor 30. The video signals comprise successive images, generally at a fixed image rate. In contrast to broadcast cameras, surveillance cameras do not necessarily operate at image rates sufficient to provide a smooth portrayal of motion; indeed, in some systems a surveillance camera might output an image only (say) once every second, or once every 0.25 seconds. Alternatively, the cameras could operate at a normal image rate (for example 25 images per second), in which case the video processor could make use of all of the captured images or could discard some of them (for example nine images in every ten received from each camera) so as to reduce the image rate of images which are subject to storage and processing.

The cameras may be monochrome or colour cameras. They may have a fixed focal length and spatial orientation, or they could be operable remotely so as to vary one or more of their pan position (their side to side variation of their field of view), their tilt position (up and down variation of their field of view) and their "zoom" or focal length. Cameras with remotely variable pan, tilt and zoom are known in the art. In embodiments of the invention, the camera(s) are at fixed locations with fixed pan, tilt and zoom settings.

The system shown in FIG. 1 would in fact operate, according to the techniques described below, with only one camera. The techniques are however applicable to multiple camera systems.

Images from the cameras 10, 20 are passed to the video processor 30 and/or directly to the image buffer 40. Each camera is positioned at a respective known location (known by manual calibration, by GPS positioning associated with the camera, or the like). The basic principle is that the images are received in real time (substantially at the time at which each image is captured) and are stored in the image buffer for later retrieval and processing. So the images could be directed to the video processor which then stores them in the image buffer, or they could be directed to the image buffer and retrieved from there by the image processor.

The operation of the video processor 30 will be described in detail below. The video processor may be implemented as a general purpose data processor operating under software control (with appropriate operating software being provided by a storage medium such as an optical disk, or by a memory within the video processor, or by a network connection such as an internet connection, or by a combination of these), or as hardware, or as programmable hardware such as one or more application specific integrated circuits or one or more field programmable gate arrays, or by combinations or two or more of these items. It will be appreciated that software or firmware by which the video processor operates is considered to be an embodiment of the present invention. Similarly, a storage medium (such as a non-transitory storage medium) by which such software is stored is considered an embodiment of the present invention. Other aspects of the embodiments to be discussed below may similarly be implemented by hardware, software, or a combination of these, and similar considerations as set out above apply to software or firmware involved in those embodiments.

The video processor is responsive to a user control 60, the operation of which will be described below. This could take the form of a keyboard, a mouse control, a set of bespoke push buttons or the like.

The image buffer (store) 40 may provide long term storage of the captured images—storage for one or two weeks or even longer is not unusual in the field of video surveillance systems—or may just provide sufficient storage in a rolling buffer arrangement so as to store images as far back as the reference image (see below). The image buffer may store data derived from the images, such as motion data. The image buffer stores its data relating to images captured over at least a reference period, which period includes the time of capture of a reference image (see below).

The output of the video processor is displayed on a display screen 50 such as a flat panel video display.

Figure 2:
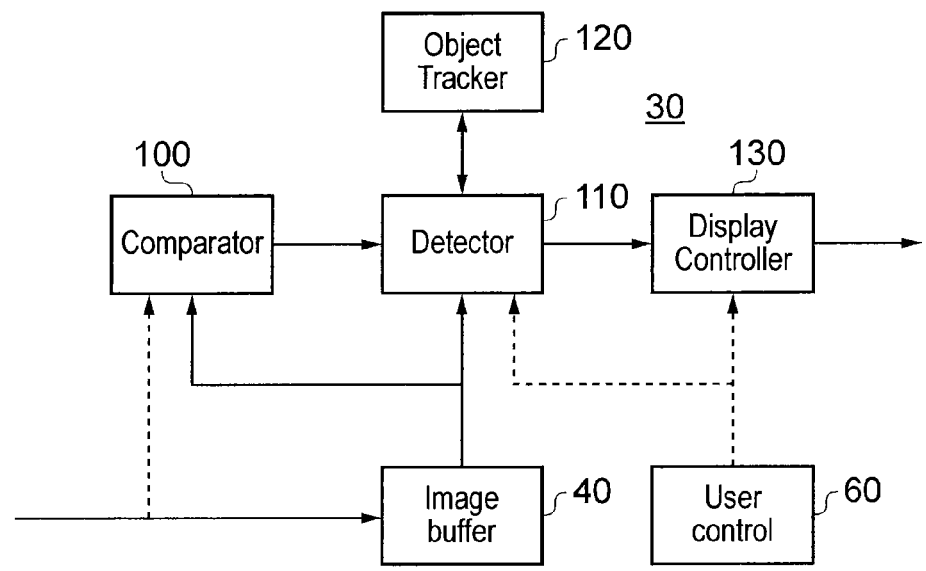
FIG. 2 is a schematic diagram of a video processor.
Figure 3A:
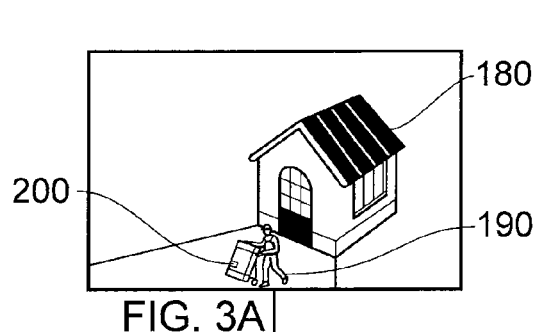
FIG. 3, drawn as FIGS. 3A-3J, schematically illustrates a sequence of ten images (images A-J respectively)
Figure 3B:
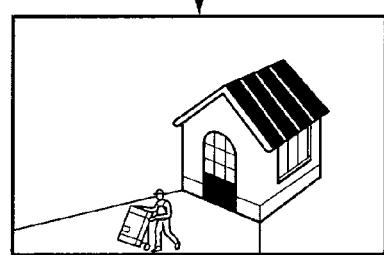
Figure 3C:
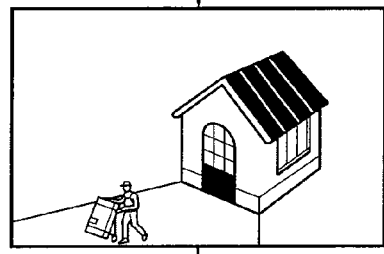
Figure 3D:
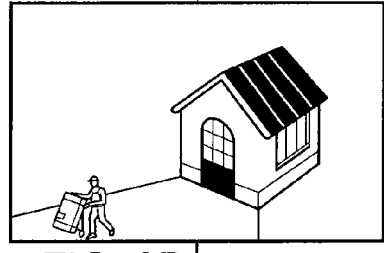
Figure 3E:
Figure 3F:
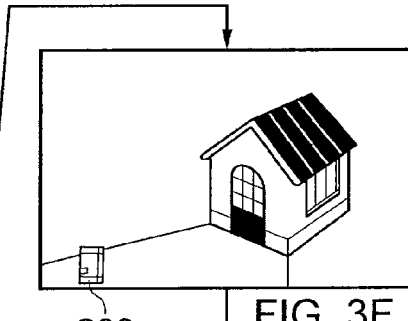
Figure 3G:
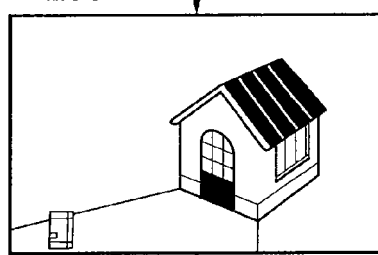
Figure 3H:
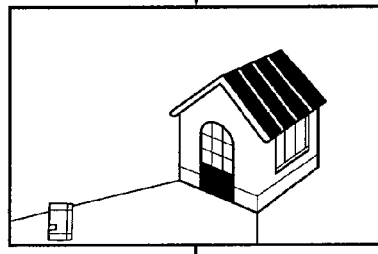
Figure 3I:
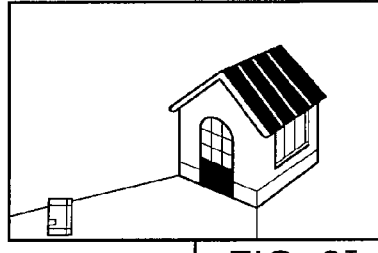
Figure 3J:
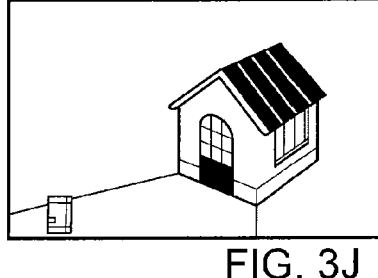

FIG. 2 is a schematic diagram of the video processor, the user control 60 and the image buffer 40 in more detail. The video processor comprises a comparator 100, a detector 110 operating in cooperation with an object tracker 120, and a display controller 130. The way in which these units operate will be described initially with reference to FIGS. 3 and 4.

FIG. 3 schematically illustrates a sequence of ten images, referenced as image A to image J in a forward temporal order. These may be ten consecutive images as captured by one camera, at an example image rate of one image every 0.5 seconds. In reality, the processes to be described below might be carried out over a much larger set of images, but only ten are shown in FIG. 3 as a schematic example to allow for a clearer drawing and explanation.

The ten images show an example scene of a house 180, with a person 190 delivering an object 200 to the house. In the images A to D, the person and the object are being brought into view, and are moving from image to image. In the image E, the object is in its final resting place (as far as this sequence of images is concerned) and the person is leaving the field of view of the camera. In the images F to J, the person is no longer in view but the object is at a static position.

The way in which the object 200 is detected and tracked will be described with reference to the flowchart of FIG. 4.

At a step 300, the object 200 is identified as a difference between a current image (for example a most recently captured image, such as the image J of FIG. 3) and a reference image.

The reference image is defined as an image captured by that camera a particular period (or a particular number of images) before the current image. The period, or the number of images before, can be set by the user by operating the user control 60, or can be predetermined within the system. For example, the reference image might be defined as an image captured five minutes before the current image, or might be an image captured 100 image periods before the current image. In this way, the definition of which image is the reference image is a rolling definition; as each new image is captured, the selection of which image is the reference image also changes, because the reference image is defined by a displacement from the newly captured image.

In other embodiments the reference image could be a fixed image stored in a separate area of the image buffer, or the reference image could be defined in a slightly more complicated way, so that the identity of the reference image changes less frequently than once every image period. For example, a certain image could be defined as the reference image until that reference image becomes more than six minutes old, at which time a new reference image is selected as the image captured five minutes before the current image. In this way, the reference image is always between five and six minutes old, and remains as the same reference image for a period of about a minute.

In the discussion of the current example of FIG. 3, the image J is the current image, and the image A could be the reference image, or alternatively an image (not shown) which precedes the arrival of the person 190 could be the reference image. In either case, at a step 300 (FIG. 4), the comparator 100 of the video processor identifies the object 200 as a difference between the current image J and the reference image. In other words, by a simple pixel-by-pixel comparison between the two images (image J and the reference image), the object 200 is found not to be present at that image position in the reference image.

At a step 310, the detector 110 detects whether the difference identified above has been present (that is, as a difference) for at least a threshold number (n) of images.

The threshold number n can be set by the user with the user control 60, or can be predetermined within the system. For example, the number n might be 25 images (at an example image rate of one image every 0.5 seconds). The purpose of the threshold number in the step 310 is to avoid detecting very transient, short duration changes.

The number of images n refers to the n images immediately preceding the current image. However, in other embodiments the system could refer to a different group of n images, for example any n consecutive images between the current image and the reference image, or even any n images between the current image and the reference image.

If the difference (that is, in this case the presence of the object 200 at that image position) is present in at least the n images, then processing passes to a step 320. If the difference is not present in at least the n images, then the process halts (as far as the current image is concerned), and the next-received current image is tested.

At the step 320, the detector 110 detects the first image, in a forward temporal order between the reference image and the current image, in which the difference identified at the step 300 is found. This could involve searching back, image by image in a reverse temporal order from the current image (possibly omitting the n images which have already been found in the step 310 to contain the difference). Or the system could test images at spaced apart temporal positions so as to establish and narrow down a range of images in which the difference first appeared, or the system could search in a forward temporal order from the reference image onwards.

Given that the same processing is likely to be carried out in respect of the next current image, and the next after that, and so on, the system may store metadata (for example in the image buffer 40) defining the position and/or presence of the object 200 in the images stored in the image buffer 40. The metadata could easily be augmented for each current image, because in the step 300 the difference (the presence of the object 200 in this example) is detected. In this way, there is no need necessarily to carry out an image processing operation to perform the step 320; it could be carried out by reference to the metadata already stored.

Once the first image in the image buffer having the identified difference has been detected, the system starts to track the arrival of the object 200 by steps 330 and 340.

At the step 330, the object tracked 120 detects the presence of the object 200 at image positions near to the eventual position (that is, near to the position of the same object in the current image). Here, the term "near to" may mean that each preceding image is searched within a predetermined (or even user-adjustable) number of pixels in any direction from the position of the object in the next-following image. The number of pixels may be, for example, 30 pixels in the context of a 64×480 pixel image.

So once the first image containing the object at its eventual position has been identified (in the example of FIG. 3, the image E) by the image tracker, the process starts at the step 330 to identify the same object in a slightly different position in the image D. The image area which is searched in the image D (using conventional image matching and object detection techniques) is based around the position of the object in the image E plus a margin 331 in any direction equal to the number of pixels mentioned above. (Note that because the object 200 is near an image edge in image E, the margin would in principle extend outside the image. Any areas of the margin outside the image are simply ignored). The object 200 is located at a slightly different position in the image D. So at the step 340, the object has been located and therefore control passes back to the step 330 to repeat the search in respect of the object position in the image D plus the margin.

This loop is repeated until the object is no longer found, each time basing the search area on the latest-identified position plus the margin. (In the example of FIG. 3, the object can be tracked back to the image A. However, in other examples such as occlusion or removal of the object, there would come a time when the object can no longer be found, in which case control would pass from the step 340 to a step 350. To cater for the possibility that the object is found in different positions right back to the reference image, the step 340 may be considered to pass control to the step 350 if the search proceeds back as far as the reference image, or (to avoid generating too much data and so giving an unclear result) if the search proceeds back by a predetermined (or user adjustable) number of images prior to the first occurrence at its eventual position.

At the step 350, a path indicative of the arrival of the object 200 is generated. This is performed by detecting the mid point of the object 200 as it was detected in each image preceding the first image at the eventual position (that is, as found at the step 320).

Figure 10:
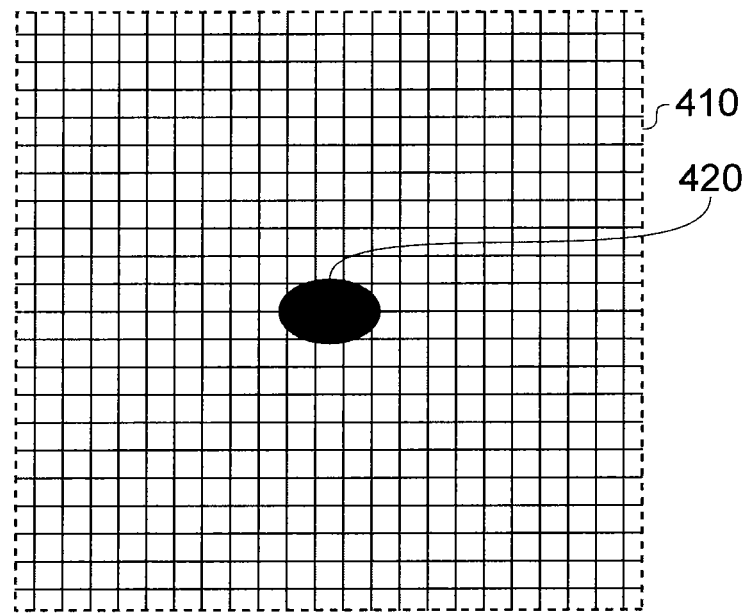
FIG. 10 schematically illustrates an object centre.

The generation of a mid point of an object can use techniques known in the art, for example by detecting an average pixel position (or a "centre of gravity") of those pixels considered to form part of the tracked object. An example mid point is illustrated in FIG. 10 and will be described below.

At a step 360, the path of the object mid point over those images leading up to the first image (as found in the step 320) is prepared for display by the display controller 130 and is displayed on the display 50, for example as an overlay of a coloured line on the current image. The user may operate the user control 60 to switch on and off the display of the overlay, and/or (where several objects have been tracked in this way) to select an object of interest for which the overlay should be displayed.

Accordingly, the comparator 100 acts to compare the current image with the reference image of the video signal, captured within the reference period, so as to detect image features (which may for example relate to a newly added object or a removed object) which represent image changes with respect to the corresponding position in the reference image. The detector 110 acts to detect whether a detected image feature in the current image has remained at substantially the same image position (for example, at the same image position or within a small threshold variation in position) over a group of images comprising at least a threshold number of images preceding (immediately or otherwise) the current image. The display 50, under the control of the display controller 130, acts to display the current image with an indication of any such image features and an indication of the duration of the presence of the image feature in respect of that image position.

Therefore, an image feature in the current image could be: a newly added object in the current image (relative to the reference image) and/or the lack of an object in the current image relative to the reference image.

The user may adjust (using the user control 60) the number of consecutive images over which an image feature has to be present, and/or the temporal position of the reference image relative to the current image.

Figure 5:
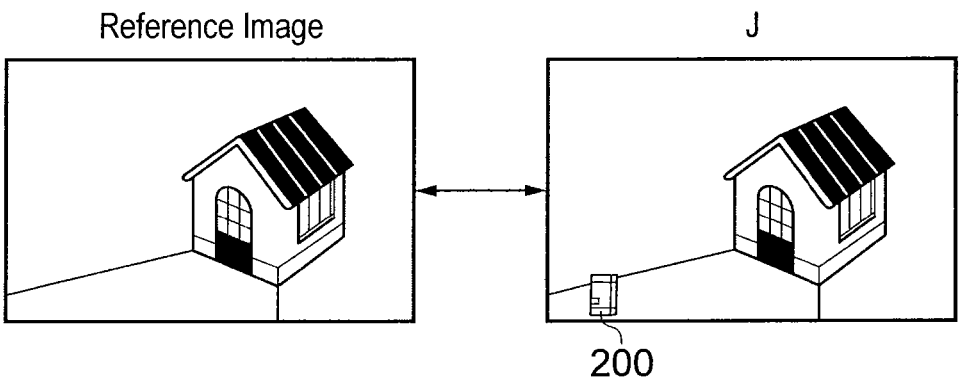
FIG. 5 schematically illustrates an object comparison step.

FIG. 5 schematically illustrates an object comparison step corresponding to the step 300. Here, a reference image (not shown in FIG. 3) is compared with the current image (image J of FIG. 3) to identify that the presence of the object 200 in the image J is a difference between the two images.

Image differences which correspond to an image feature smaller than a threshold number of pixels in any direction (for example 10 pixels in a 640×480 pixel image) can be set to be ignored by the system, as they may be due to noise or to physical features (such as litter) which is considered to be of no significance.

Figure 6:
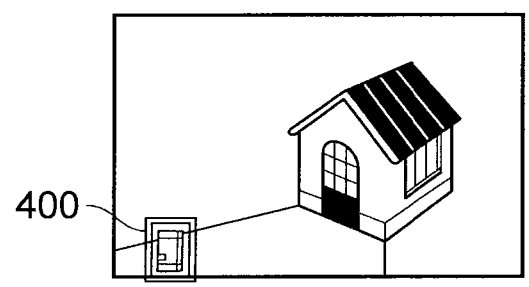
FIG. 6 schematically illustrates the identification of a detected object.

FIG. 6 schematically illustrates the identification of a detected object by the display controller, as an identifying overlay 400 on the display 50. In this example, the display controller can identify the object detected in the step 300 by drawing a coloured border around it. This is different to the display of the path of the object, and in fact if several objects are highlighted as differences in this manner, the user may use the user control to select one or more of them. In response to such a selection, if the object path has already been identified, then the object path can be displayed. Alternatively, such a selection of an object of interest could cause the system to carry out the steps 320 to 360, so that the system avoids tracking objects unless they are identified by the user to be of interest.

Figure 7:
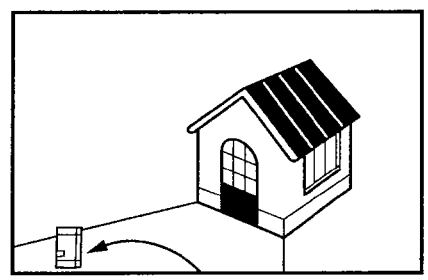
FIG. 7 schematically illustrates the output of an object path.

FIG. 7 schematically illustrates the display of an object path as described above. Here a line (optionally with an arrow head indicative of the direction of motion of the object in a forwards temporal direction) may be overlaid by the display controller to indicate the detected motion of the object towards its current position.

Figure 8:
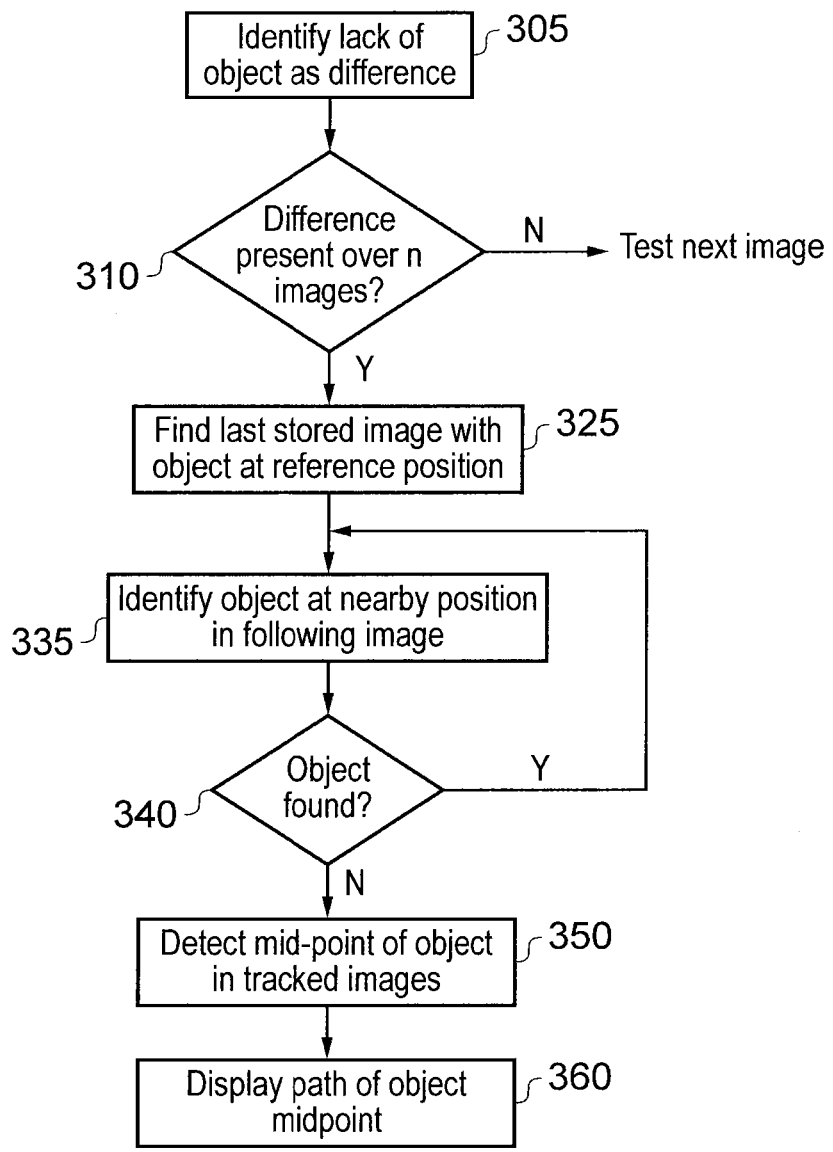
FIG. 8 is a flowchart schematically illustrating another example of a video processing method.

The discussion so far has been relevant to the detection of an object which is present in the current image but which was not present in the reference image. This is relevant to detecting suspicious objects such as litter or even suspect explosives being deposited in an area. Almost the same technique can be applied to an object which was present in the reference image but is no longer present in the current image. This arrangement is relevant to detecting thefts or the like. FIG. 8 is a flowchart schematically illustrating a video processing method similar to that shown in FIG. 4, but as applied to the detection of the removal of an object from a scene.

Figure 4:
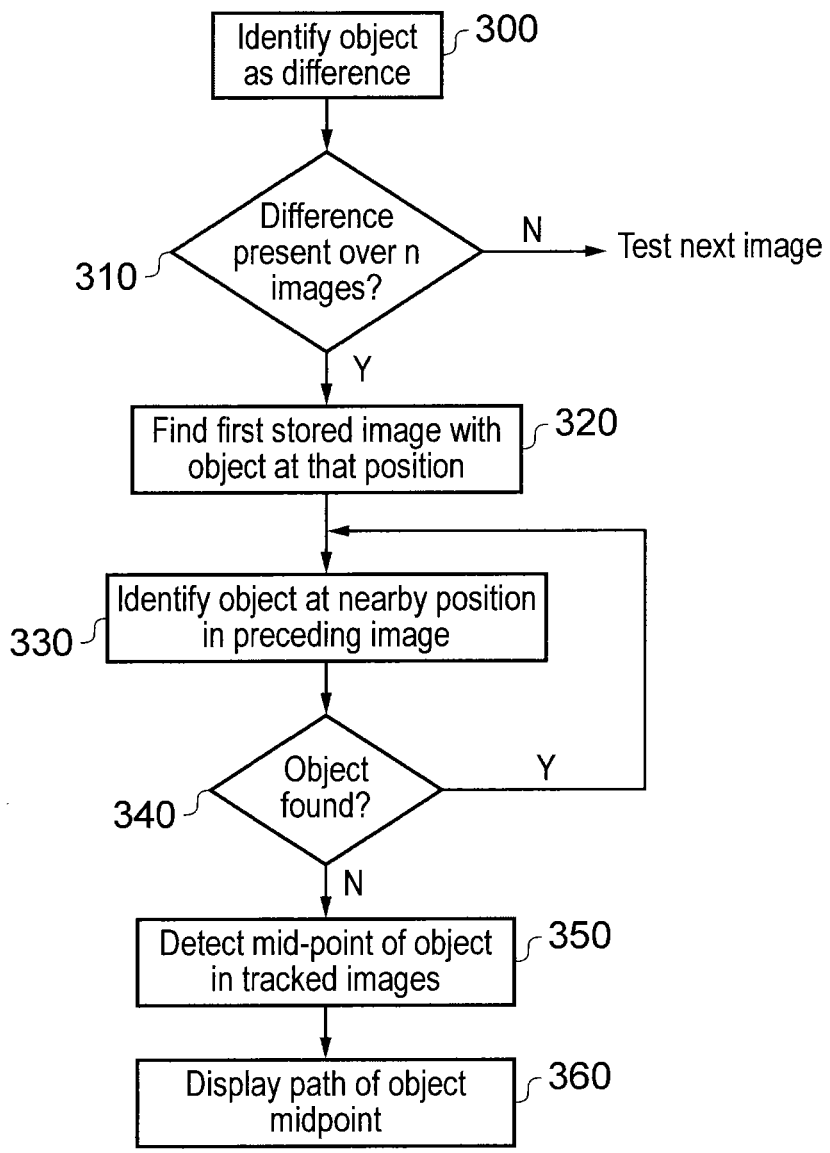
FIG. 4 is a flowchart schematically illustrating a video processing method.

Many of the steps of FIG. 8 are in fact identical to those of FIG. 4. In particular, the steps 310, 340, 350 and 350 are effectively identical to those shown in FIG. 4 and will not be described again in detail. Even though the remaining steps are different, there is a high degree of similarity with the corresponding steps in FIG. 4.

At a step 305, a difference between the current image and the reference image is identified by the comparator 100 as the lack of an object in the current image which was present in the reference image. If (at the step 310) the detected difference was found (by the detector 110) present over n images (as described above) then control passes to a step 325 at which the last (most recently captured) stored image showing that object is identified by the image tracker. At a step 335, a search for the object at nearby positions (as defined above) is commenced by the image tracker, but this time to look for the object in images following (in a forward temporal order) the image identified at the step 325. Once the track of the object has been found as the object leaves the scene (or at least leaves its position in the reference image), the track can be displayed at the step 360 as described above.

Figure 9:
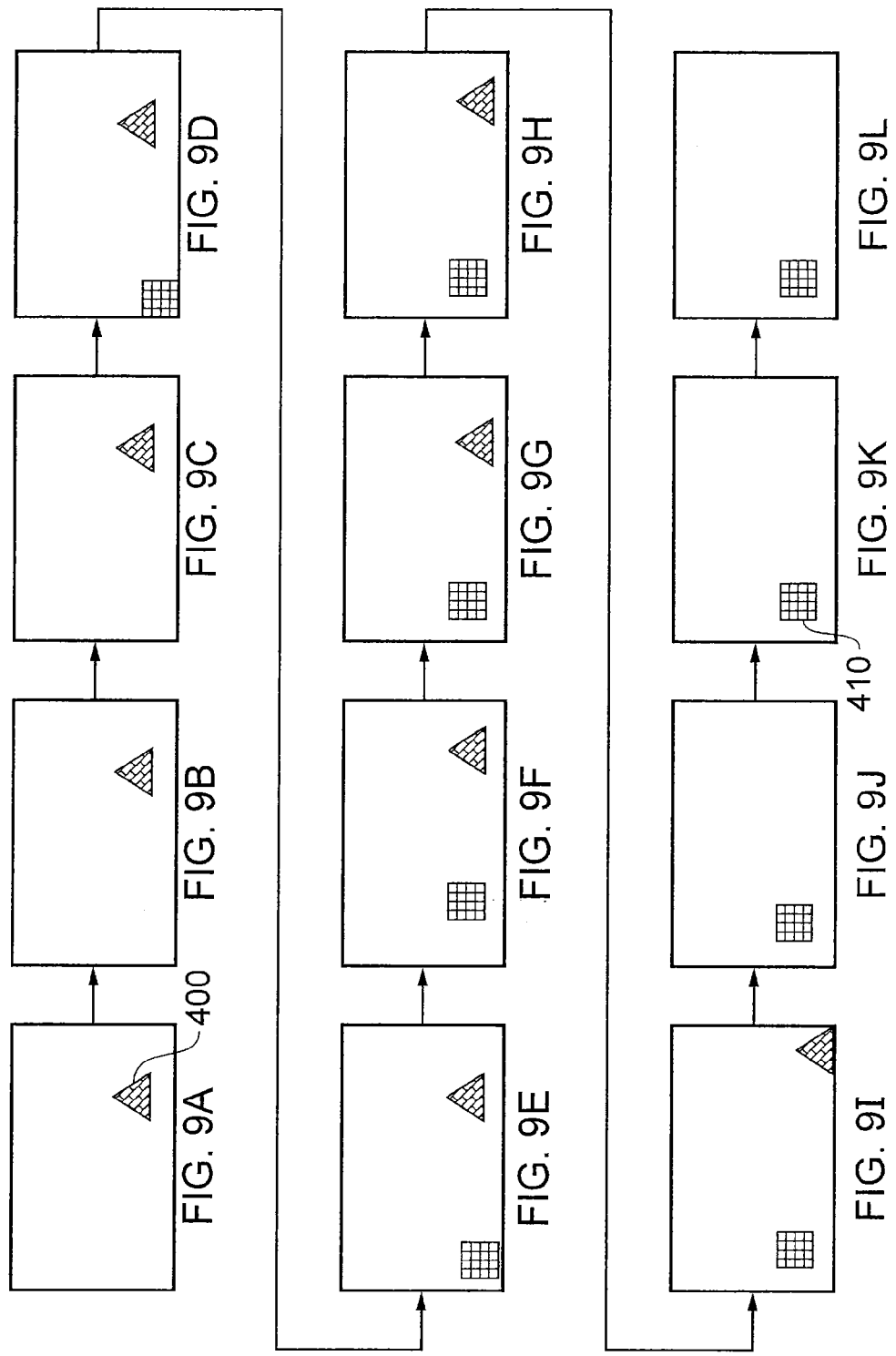
FIG. 9, drawn as FIGS. 9A-9L, schematically illustrates a sequence of twelve images (images A-L respectively) to demonstrate the operation of the video processing methods shown in FIGS. 4 and 8.

In practical terms, embodiments of the system would carry out both of these processes. That is to say, the system could identify new objects as well as missing objects in the current image. FIG. 9 schematically illustrates a sequence of twelve images A to L to demonstrate the operation of the video processing methods shown in FIGS. 4 and 8 together.

In FIG. 9, a triangular shaped object 400 is present in the image A (taken as the reference image in this example) but is absent in the current image L. It is therefore identified as a removed object by the step 305. Similarly, a square shaped object 410 is not present in the reference image A, but is present in the current image L, so it is identified as an added object.

Both differences are detected (by the step 310) to have existed for at least n images before the current image L (where n is 5 in this example). The first image at which the square object 410 appeared at its current position is found to be the image F, and the last image at which the triangular shaped object 400 was at its reference position is found to be the image F. The path of the square object as it approaches its current position during the images D and E is therefore tracked, and the path of the triangular shaped object is tracked as it leaves its reference position over the images G, H and I.

FIG. 10 schematically illustrates an object centre 420 as determined at the step 350 using the average pixel position techniques as described above.

Figure 11:
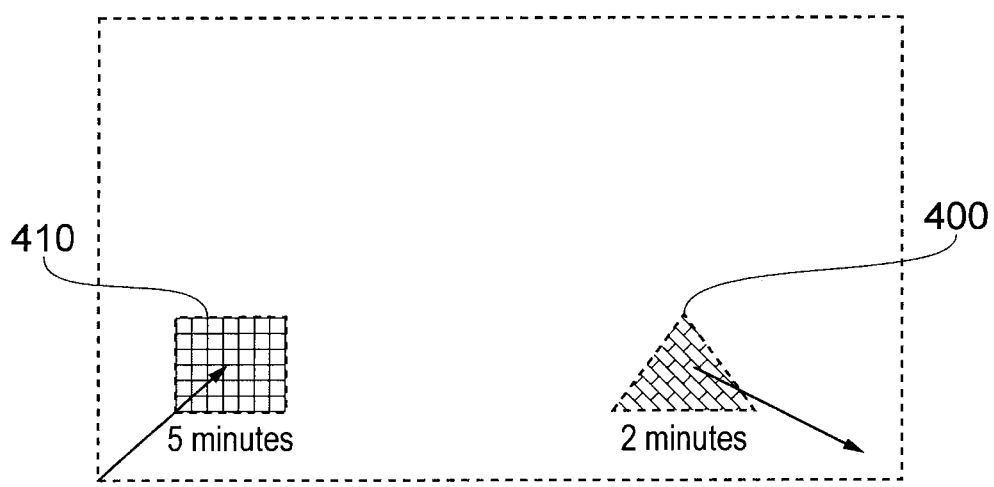
FIG. 11 schematically illustrates the results of an object tracking process.

FIG. 11 schematically illustrates the results of the object tracking process as applied to the example shown in FIG. 9. Here, the newly added object 400 is displayed in its current position (as it is in fact part of the current image L), along with a motion or movement track showing, as a representation of a set of successive positions of the object, the arrival of its mid point over the images D and E. The omitted object 400 is shown as an overlay in its original position (for example, with reduced contrast and/or transparency and/or in a flashing format), along with a similar motion or movement track showing the path of the departure of its mid point over the images G, H and I. The duration of the presence of the image feature, for example the time for which the newly arrived feature 400 has been present (5 minutes in this example) and/or the time since a newly removed object was last present (2 minutes in this example) can be displayed near to the objects or at predetermined display positions, under the control of the display controller 130.

The discussion above has referred to a comparison between the current image and the reference image. It will be appreciated that the current image need not be an image that is most recently captured at the time that the process is carried out. The user could define a stored image as a "current image" for the purposes of the processes described above. That is to say, for example, if the user wants to look back at stored video material to detect the arrival or departure of an object, the user can find a previous image in which a newly arrived object was present, and carry out the processes described above in order to establish its path of arrival.

The ability for the user to change the position (relative to the current image) of the reference image and/or the number n of images over which the change must have been present (in the step 310) allows the user to identify changes occurring at different rates, or in other words to vary the sensitivity and the susceptibility to noise of the system.

The embodiments described above have referred to one or more cameras with fixed pan, tilt and zoom. It is possible to use one or more cameras with variable pan, tilt and zoom. One way to achieve this is to store metadata associated with each image defining the pan, tilt and zoom settings, and to use the metadata to compensate for changes in pan, tilt or zoom from image to image, when searching for objects in images other than the current image.

Figure 12:
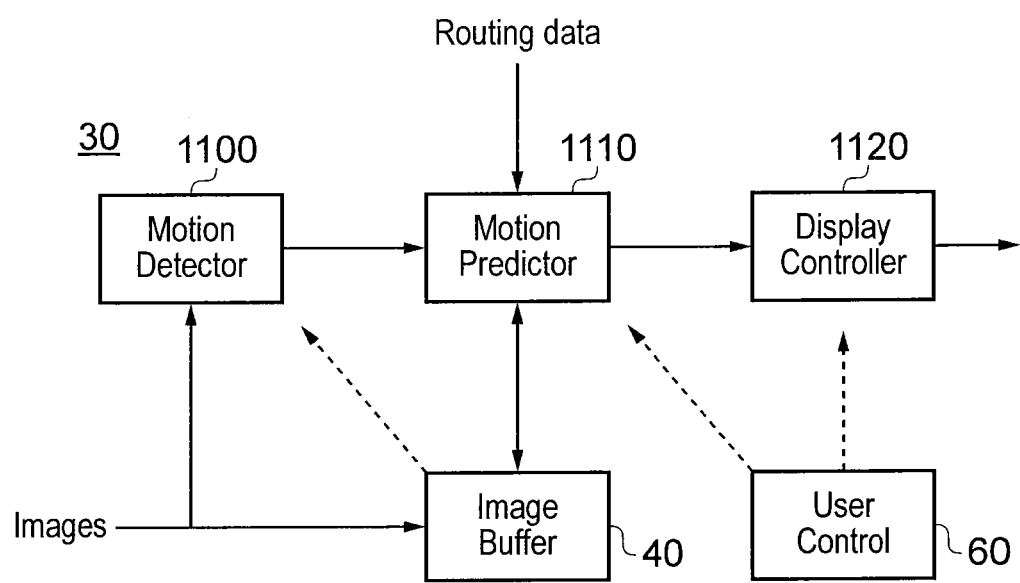
FIG. 12 is a schematic diagram of another embodiment of a video processor.

FIG. 12 is a schematic diagram of another embodiment of the video processor 30 and shows a motion detector 1100, a motion predictor 1110 which is optionally responsive to routing data defining various possible routes from the observed location of an object to the field of view of another of the cameras, and a display controller 1120.

The features of the embodiment shown in FIG. 12 and described below may operate in cooperation with the features of the embodiment shown in FIG. 2 and described above. That is to say, a single video processor 30 may incorporate both sets of functionality, or permutations of the two. Examples of ways in which this may be achieved are discussed below.

Images captured by the two or more video cameras 10, 20 are supplied to the image buffer 40 and/or to the motion detector 1100. The image buffer 40 acts as an image store for storing data relating to images of the video signals from the cameras. The motion detector detects motion (such as moving objects or image features) in the captured images, that is to say, within the field of view of at least one of the video cameras, and also detects whether the image feature relates to an object of interest. For example, in the general area of video surveillance, there is probably little interest in tracking the motion of a domestic cat, whereas there could be significant interest in tracking the motion of a suspected criminal. The motion detector may use known object recognition techniques to detect whether a moving image feature relates to an object of interest. In doing this, the motion detector may refer to a set of classes of objects of interest, which may be set by the user, for example the classes of people, motor vehicles, bicycles (which implies that they are accompanied by riders, given that motion is being detected) and motorbikes.

Motion is detected by examining image changes between successive images of a video signal. In this respect, the motion detector uses know motion detection techniques such as block matching between images.

Accordingly, the motion detector 1100 is operable to detect image motion of an image feature within the field of view of one of the video cameras and for deriving a corresponding physical motion of an object represented by the image feature.

When motion is detected, the motion detector is arranged to detect a corresponding physical motion (direction and/or speed) of the object, and passes data defining the motion and the object which is moving to the motion predictor. The motion predictor is arranged to predict the physical motion of the object with respect to the known locations of the cameras so as to derive an expected time when the object may be observed in the field of view of another of the cameras. This can operate in either a forward or a backward direction (or both), which is to say that it predicts where a detected moving object will be at a later time, or where a moving object may have been at a previous time, or both, based on the current motion (which, in embodiments of the invention, includes the detected direction of motion of the object) and the nature of the object. In either case, the prediction is relevant to detecting times when the object may be (or may have been) observed in the field of view of another camera.

The nature of the object affects the prediction in a relatively simple way. For example, if the moving object is a pedestrian, then the expected distance that the pedestrian could be expected to cover from the starting point is less than if the moving object is a car or a motorbike. Ways in which the nature of the moving object can be taken into account will be described below.

An aim of the motion predictor is to predict when the moving object of interest will come within the field of view of another camera (in the case of forward prediction) and/or when it may have previously come within the field of view of another camera (in the case of backward prediction). These predictions can be carried out in respect of currently captured images, in which case the forward predictions will, at the time they are made, relate to some time in the future. Or the predictions can be carried out in respect of stored images captured at some time before the time at which the prediction process takes place. This can be useful, for example, as part of the analysis of a crime incident by the police after the crime has taken place. In such situations, even the forward prediction of motion could still point to video material captured at a time before the motion prediction process is carried out, and so the results of the forward prediction can be to point to other material stored in the image buffer or in an equivalent buffer of another apparatus elsewhere.

The motion predictor can therefore provide various types of output. If the predicted motion results are in the future (at the time that the prediction is carried out) then the system can display an indication of when and where the object of interest may be expected to be seen, and the system may set a timer (not shown) so that video material from the expected position of the object of interest is displayed at the appropriate time. If however the forward prediction points to stored video material, the stored material can be accessed and displayed straight away. In terms of the backward predictions (where the object of interest came from and when), assuming the appropriate video material was stored, then the material can be accessed and displayed straight away. The video signal is accessed within a threshold time of the time at which the motion predictor predicts the object may be present, or alternatively the motion predictor may output a range of times (a predicted time plus or minus an uncertainty threshold) for access. The display controller handles the display of the recovered video material.

Accordingly, the motion predictor is operable to predict the physical motion of an object with respect to the known locations of the cameras so as to derive an expected time when the object may be observed in the field of view of another one of the cameras.

In general terms, the motion predictor is operable, with respect to an image feature in an image under consideration:

to predict motion of the object prior to the object being observed in the image under consideration, so as to derive an expected time before the time of the image under consideration when the object may have been observed in the field of view of another one of the video cameras; and/or to predict motion of the object after the object is observed in the image under consideration, so as to derive an expected time after the time of the image under consideration when the object may be observed in the field of view of another one of the video cameras.

In embodiments of the invention, when a video signal for a camera is stored in the image store in respect of an expected time at which the object may be observed in the field of view of that camera, the motion detector is operable to detect the presence of the object in images captured by that camera within a threshold period of the expected time.

It would be potentially impractical to carry out this type of analysis for every object detected as moving (and as an object within one of the classes identified above) by the motion detector. This would lead to the generation of a confusingly large amount of data. Therefore in some embodiments of the invention there is a user option, operated by means of the user control 60, to select an object to be subject to this analysis. The selection could be, for example, by the user choosing an object displayed on the display screen, using a mouse or similar control. The selection could be from a group of detected objects, where a user selects from the group an object or objects for analysis.

Further details of the processing carried out by the apparatus of FIG. 12 will be given below.

One important aspect of the apparatus of FIG. 12 is that it estimates the current speed of an object of interest in order to derive a prediction of where that object was or will be at some other time. One way in which this can be done is to estimate speed according to the class of the object. For pedestrians the estimated speed could be 5 km/h (kilometers per hour). For a running person the estimated speed could be 10 km/h. For a motor vehicle, the estimated speed depends more on the nature of the roads along which the vehicle will pass than the type of vehicle itself. A first estimate of the expected speed could be that the vehicle will travel at the legal speed limit along each road, as defined by the routing data. This may be a high estimate if the traffic conditions are busy, or could be a low estimate in the case of a fleeing criminal. But it provides a useful estimate. The estimate can be refined by allowing short periods of time for the vehicle to negotiate each road junction along a supposed route, with more time being allowed, say, for right turns than left turns (in countries where vehicles drive on the left), and more time for traffic light controlled junctions than free junctions etc. Information relating to local road speed limits can be provided as part of the routing data. A further refinement of the expected travel speed of a motor vehicle is to use routing data comprising traffic condition data available on a number of internet sources and indicating current average vehicle speeds for some roads. If this data is used then in embodiments of the invention the data is archived alongside the video material (in an appropriate storage arrangement, which may or may not be part of the image buffer 40, and operable to store routing data in association with images captured at times relevant to that routing data), so that historic traffic condition data can be accessed if required later. Archiving alongside the video material does not require that the two sets of data are stored in the same manner or even by means of the same storage medium or arrangement. But it does mean that the associated data is stored in such a way that, when or if this is needed, the data can be associated with or re-associated with the video material on a temporal basis, that is, at times relevant to the video material. That is to say, video material relating to a particular time or time period can be accessed, and associated data relating to that same time period can be accessed so that the two can be used in cooperation by the motion predictor and the display controller.

In a similar way, other data can be archived alongside the video material. Examples here are mapping data (acting as routing data) providing the layout, at the time of capture of the video material, of the roads, paths and the like in the vicinity of the camera in question. Some sources of mapping data are updated relatively slowly, meaning that there can be a significant time lag between a road or path layout changing, and the mapping data being changed to reflect this. However, there are other sources of mapping data which can be updated much more quickly, an example (at the time of filing, and relevant at least to parts of the United Kingdom) being provided by http://www.openstreetmap.org/.

Another option is that a pedestrian makes use of public transport for part of a journey to the field of view of another camera. Here, the routing data may include details of local public transport services or links such as bus and train services. In some cases, live departure data is available to indicate actual (rather than intended) departures of such services and can also be archived for later reference as described above.

In general, the motion predictor 1110 is responsive to routing data defining possible routes from the observed location of the object to the field of view of the other of the cameras. The routing data may comprise map dated defining possible routes from the observed location of the object to the field of view of another of the cameras. Alternatively or in addition, the routing data may define transportation links for at least part of a journey between the observed location of the object and the field of view of another of the cameras. In embodiments of the invention, the routing data may provide actual journey times by those transportation links. In embodiments of the invention, the routing data can comprise speed data defining the expected speed of the object between the observed location of the object and the field of view of another of the cameras.

The assessment of object speed by the motion detector 1100 will now be discussed.

Figure 13:
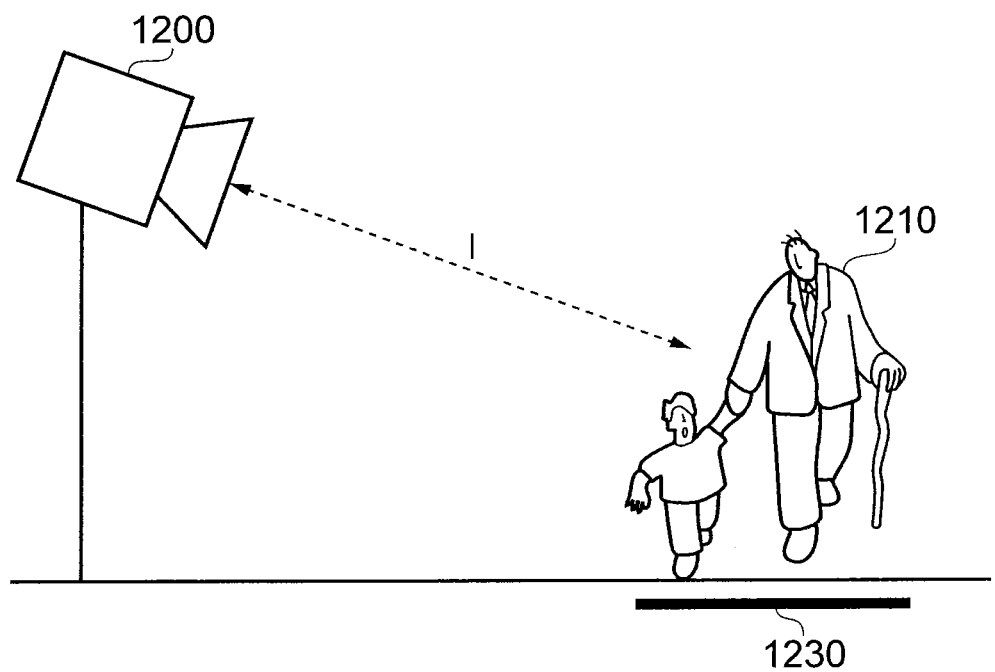
FIG. 13 schematically illustrates a surveillance situation.

FIG. 13 schematically illustrates a surveillance situation in which a camera 1200 is mounted in a known position and has two pedestrians 1210 within the field of view of the camera.

As mentioned above, the speed v (see FIG. 14 which is a schematic representation of an image captured by the camera 1200) of the pedestrians could be estimated simply from the fact that they are pedestrians. However, other techniques (which can be used individually or in combination) will now be described to assess the speed.

Figure 14:
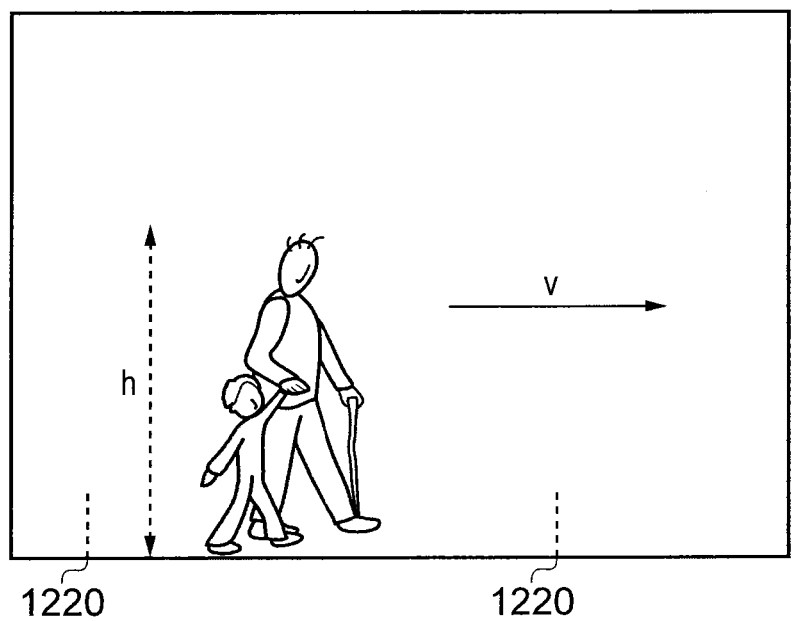
FIG. 14 schematically illustrates an image captured by a camera shown in FIG. 13.

In one technique, a speed estimate is derived from the rate at which the pedestrians progress across the image, as a function of an estimated distance such as the image height of the pedestrians (h, FIG. 14). If h is estimated to be, say, 1.6 m, then the image size (height in pixels) corresponding to h can be used to estimate a horizontal distance of 1.6 m. The time taken for the pedestrians to proceed along this distance gives an estimate of their speed.

In another technique, a camera could be pre-calibrated with physical positions 1220 spaced a known distance apart, and the time taken for the pedestrians to pass between these points can give an estimate of speed. This arrangement works better when the pedestrians are constrained to one (or a small number of) possible path(s) 1230 (FIG. 13). In general, if the camera is calibrated according to features on the ground (which may be by a manual process, or could be assisted by the known position of the camera and/or a GPS receiver associated with the camera, and/or by image recognition of nearby features based on mapping data and the known position of the camera) then moving objects can be tracked for their speed and/or direction between a much wider, or potentially substantially unlimited, range of positions within the field of view of the camera.

The motion detector can detect whether the moving object under surveillance is a person (walking or running) or a vehicle in a number of ways. One way is to consider the speed of the object. If the speed is very low, this test alone is inconclusive, but if the speed is over a threshold speed (of perhaps 10 miles per hour) then the assumption is made that the object is a vehicle. A second factor is the size of the object. Again, if the size is small then the test can be a little inconclusive, because there exist large people who are probably of a similar size to a small person astride a small motorbike. But if the size is above a threshold size (of perhaps two square meters when viewed from the side) then the assumption can be made by the system that the object is a vehicle. Another example is to use object recognition techniques, which are known as such, and which can provide an indication of the type of object (a person, a vehicle etc) based on matching the shape and features of the detected object to known properties of the different object types.

Figure 16A:
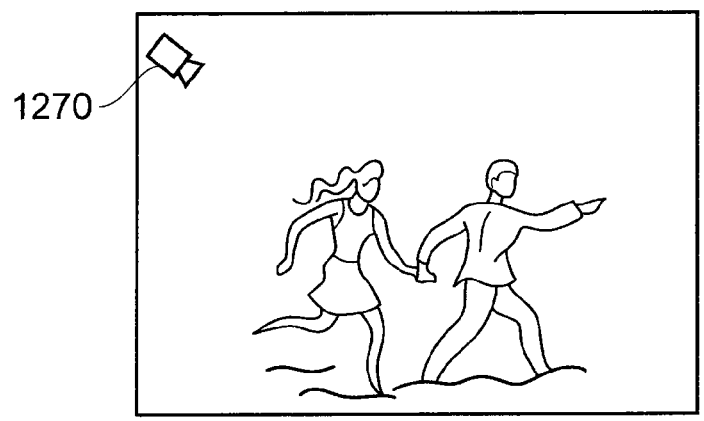
FIGS. 16A and 16B schematically illustrate images of the same scene as captured by the pair of cameras of FIG. 15.
Figure 16B:
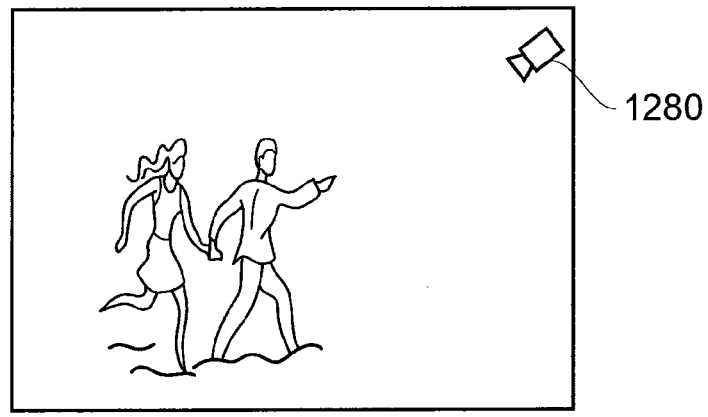
Figure 15:
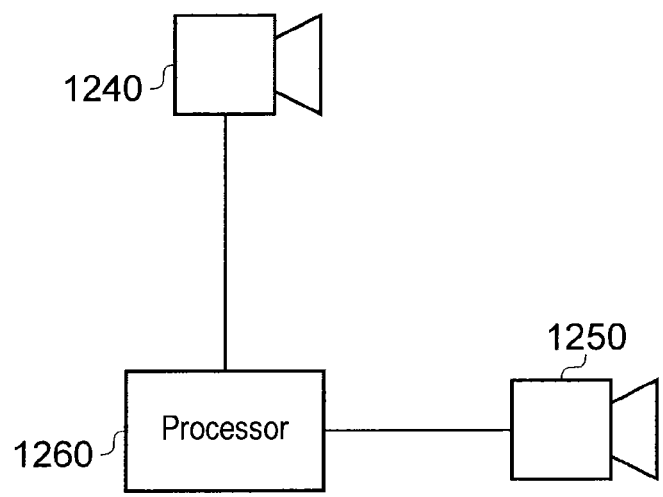
FIG. 15 schematically illustrates a pair of cameras.

FIG. 15 schematically illustrates a pair of spaced-apart cameras 1240, 1250 at known locations and a processor 1260 operable to derive position and estimated speed information by known triangulation techniques between the images captured by the two cameras. FIGS. 16A and 16B are schematic examples of the respective captured images.

Note that in a feature of some embodiments of the invention, icons 1270, 1280 (see FIGS. 16a, 16b) are provided on each image (as displayed on the display 50, not as stored) to indicate that another camera has an overlapping view of the same scene and to illustrate the general direction of that view. The user can select (for example click on) an icon to cause the display to show images from the newly selected camera.

Figure 17:
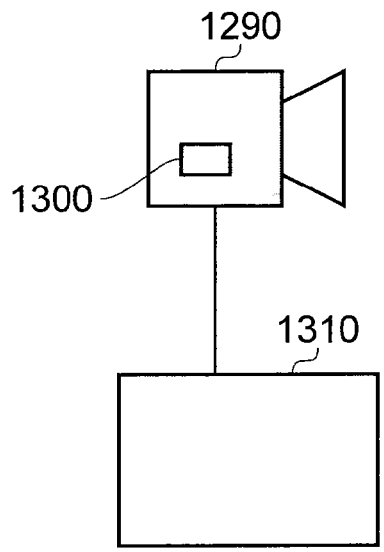
FIG. 17 schematically illustrates a camera with a location detector.

The known location of each camera can be established manually by the operator, but as an alternative, FIG. 17 schematically illustrates a camera 1290 with a location detector 1300 such as a global positioning system (GPS) receiver, coupled to a processor 1310. The GPS receiver 1300 provides the geographical location of the camera. The processor 1310 can use this information to derive the distance of the camera from a known geographical feature such as the path 1230 (FIG. 13). Using this distance information and the focal length of the camera, the speed of an object passing along the path 1230 can be estimated from its rate of progression across an image captured by the camera.

Figure 18:
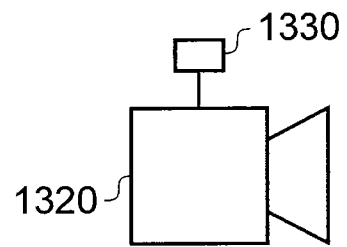
FIG. 18 schematically illustrates a camera with a range detector.

FIG. 18 schematically illustrates a camera 1320 with a range detector 1330. The range detector can use known optical, ultrasonic or radar techniques to detect the range I (FIG. 13) or even the speed of a moving object. Again, using the range and the focal length of the camera, the speed of an object at that range can be derived from its rate of progression across an image.

Figure 19:
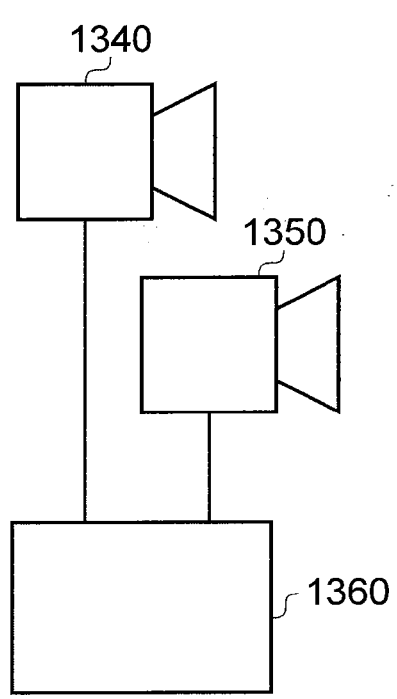
FIG. 19 schematically illustrates a stereoscopic camera.

FIG. 19 schematically illustrates a stereoscopic (stereo) camera formed of two image capture devices 1340, 1350 and a processor 1360 which can operate to generate range information for an object in an image captured by the stereo camera. Note that the camera does not have to output a stereo image; the image supplied to the video processor 30 could be monoscopic, with the stereo information simply being used by the camera of FIG. 19 to generate range information.

Figure 20:
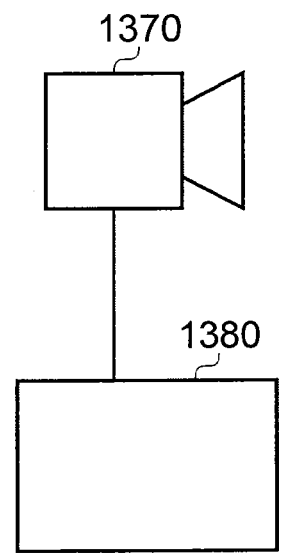
FIG. 20 schematically illustrates a camera and image analyser

FIG. 20 schematically illustrates a camera 1370 with a processor 1380 operable to derive estimated speed information as discussed with reference to FIG. 14, for example from image height or similar information.

In the above examples, at least part of the function of the processor could be carried out by the motion detector 1100, or could be localised at the camera head, in which case speed or range information can be returned as metadata with the images sent by the camera to the video processor 30.

The examples have related to pedestrians, but similar techniques apply to the detection of motion of other objects such as motor vehicles.

Once the speed (and direction, obtained simply by detecting which way the object progresses across the image, given the known location of the camera) has been established, the next part of the process is for the motion predictor 1110 to predict future or past movements of the object of interest from the speed and/or direction data. For this, routing data can be useful.

Routing data can include one or more of: mapping data showing possible geographical routes near to the camera site; details of public transport facilities such as timetables, routes and live timing data; and details of traffic speed limits, live actual average speeds, junctions and the like.

FIGS. 21 to 24 are schematic illustrations of routing data.

Figure 21:
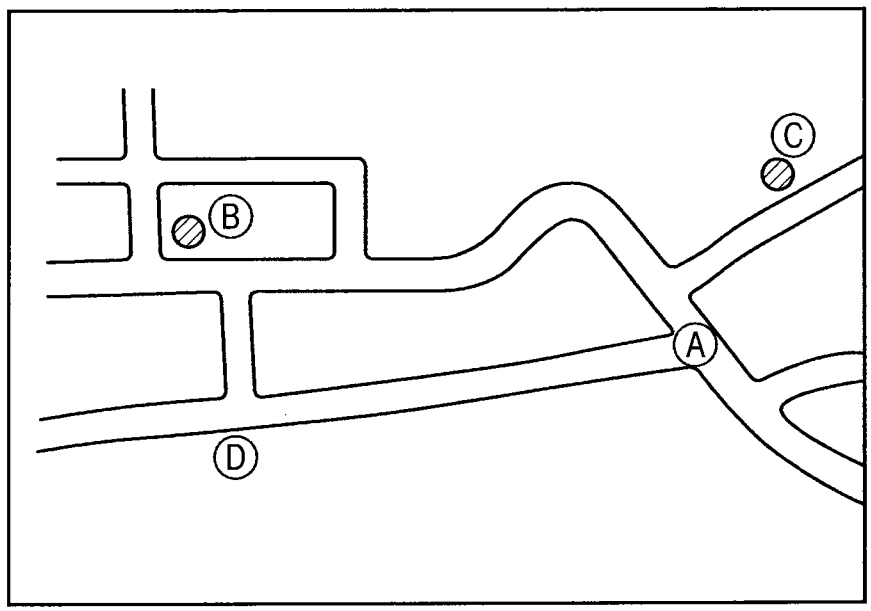
FIGS. 21 to 24 are schematic illustrations of routing data.

FIG. 21 schematically illustrates a portion of a map showing a position (A) at which an object of interest has been captured on a surveillance camera, positions (B), (C) and (D) of other nearby cameras, possible routes between the camera sites, and two railway stations (at locations (B) and (C)).

The techniques to be described allow the prediction of a time at which the object of interest either was at a certain location (backward prediction) and/or will be at a certain location (forward prediction) relative to the time of capture of the images being analysed. The examples will relate to predicting the time at which the object was/will be at another camera site, but could instead be applied to other sites such as police road blocks and the like.

Figure 22:
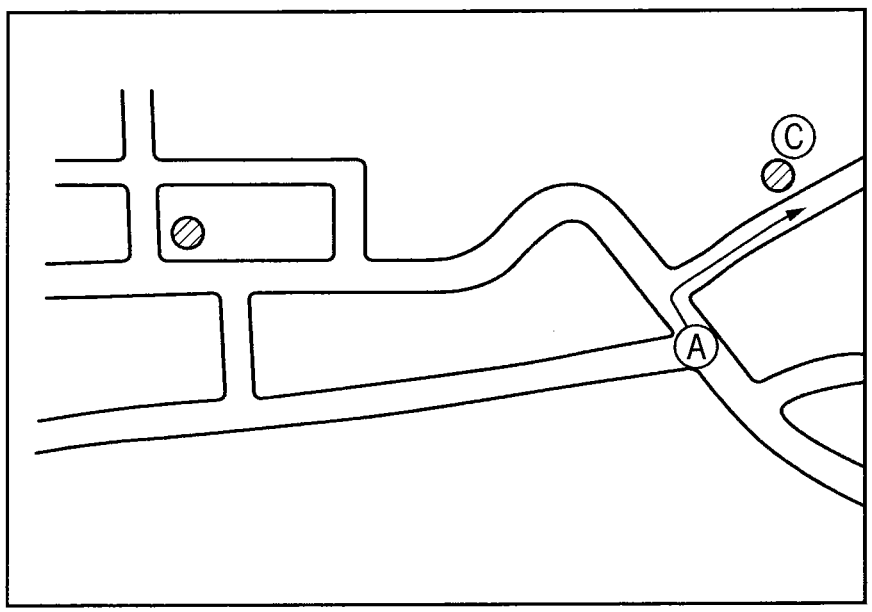

Referring to FIG. 22, a pedestrian of interest is detected at the site (A) and a prediction is made as to what time the pedestrian may be at the site (C). There is only one practical route from (A) to (C), so the distance of this route (known from the routing data and from the known geographical locations of the two cameras) is combined with the estimated speed of the pedestrian derived as above, to arrive at an estimated time at the point (C). Video material at or near this time (say, within a margin of 10% of the time difference between the time at (A) and the predicted time at (C)) is accessed to detect the pedestrian at the site (C).

Note that the system cannot detect the intentions of the pedestrian. The pedestrian may not intend to move to the site (C). The system just forms a prediction of when the pedestrian may be at the site (C) if he chooses to go there.

Figure 23:
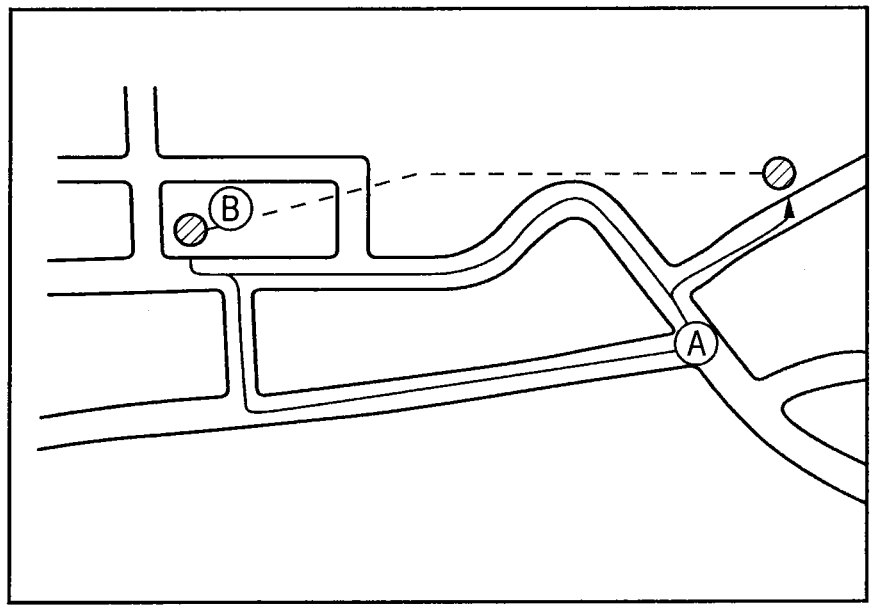

Other options are also considered in FIG. 23. The pedestrian may be intending to go to the site (B). There are two road routes to site (B), or instead the pedestrian may travel to site (C) and catch the train. The two road routes are estimated from the speed of the pedestrian and the respective distances. The time of arrival by train is estimated from the time that the pedestrian is expected to arrive at the site (C), in combination with the planned or actual times of departure of trains from (C) to (B), bearing in mind that if a train is likely to depart within a short time (for example two minutes) of the expected arrival time at (C) on foot, the pedestrian may well hurry to try to catch that train.

Figure 24:
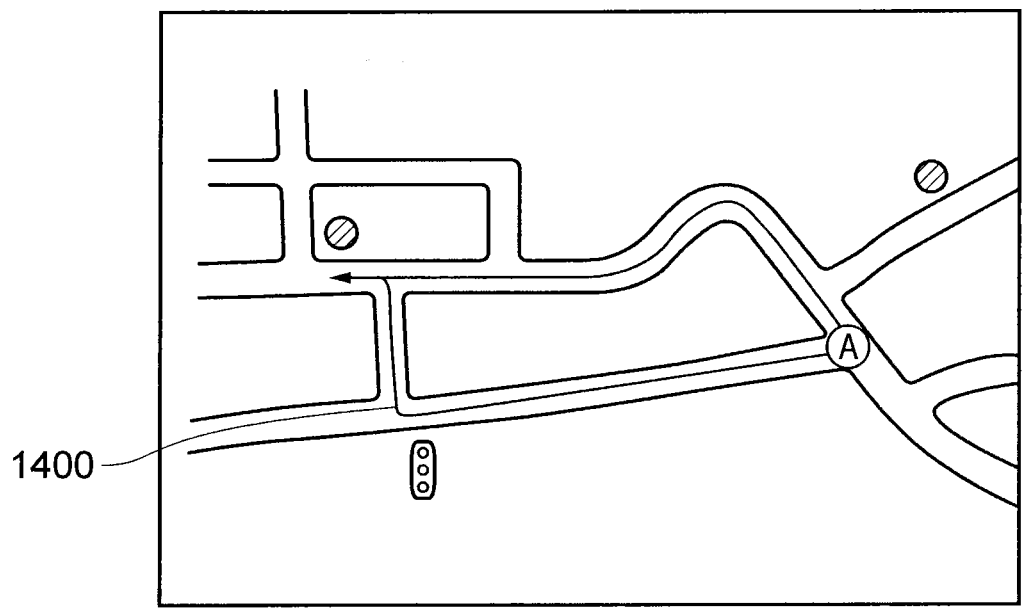

FIG. 24 shows a traffic light controlled junction 400 which would be taken into account, as described earlier, if the object of interest were a motor vehicle following that route.

Figure 25:
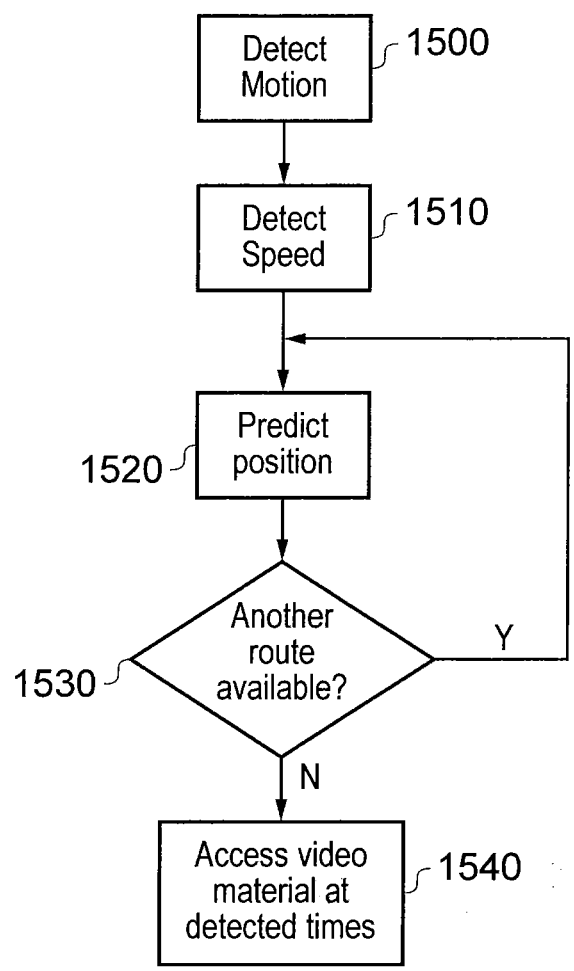
FIG. 25 is a schematic flowchart illustrating a method of video surveillance.

FIG. 25 is a schematic flowchart illustrating a method of video surveillance.

At a step 1500, the motion detector 1100 detects image motion of an object of interest.

At a step 1510, the motion detector detects or estimates the speed of the object as described above.

At a step 1520, the motion predictor 1110 predicts the future or past position of the object at a certain time. If another possible route is available (a step 1530) the process is repeated. This generates a number of possible outcomes, in terms of where the object might be/might have been based on the estimate of the object's motion at the step 1500.

Finally, the motion predictor accesses video material (once it is available) relating to the predicted position and time, for display on the display 50. If more than one outcome was derived in the step 1520, then the user may choose to view one set of video material at a time.

Other options available at this stage (in addition to or instead of accessing the video material) are to access other content or information relating to the predicted times and geographical locations of the object of interest. Examples here might include: video material from cameras run by other providers (an example being traffic speed enforcement cameras, in the case of a rapidly fleeing criminal), records of public transport smart cards being used, records of store loyalty card use, mobile phone location tracking and so on.

Ways in which the various embodiments and techniques described above may operate together will now be described.

As an example, in the techniques described with respect to FIGS. 2-11, a facility is provided (see for example the steps 350 and 360 in FIG. 4) to derive a motion path indicating the motion of an object as it arrives at its current position, or as it left its previous position. Examples of such motion tracks are shown in FIG. 7.

The data from which the motion track is derived can form an input to the processes described with reference to FIGS. 12 to 25.

That is to say, the data from which the motion track is derived (which could in fact be derived by operation of the motion detector 1100 providing some or all of the functionality of the object tracker 120, or vice versa) can act as input data to the motion predictor 1110. In the case of an object which is currently present in the image but which was not present in the reference image, the motion track data can indicate the time (or the identity of the image or range of images) at which the object first arrived, so that the motion predictor can operate in a backwards temporal direction so as to predict earlier motion of that same object and access video material (which may be from other cameras) potentially relating to that earlier motion using the method of FIG. 25.

In the case of an object which was present in the reference image but which is no longer present, the motion track data can indicate the image or range of images at which the object left its previous position. Again, in instances where the object is no longer in the image at all, the motion predictor 1110 can operate on such data as described above so as to predict where the object might be at later points in time, and so access video material (which may be from other cameras) potentially relating to later views of the object.

The multiple camera arrangement discussed with reference to FIGS. 16*a* and 16*b* is also usefully applicable to the embodiments described with reference to FIGS. 2 to 11, in that just before an object enters the image (as shown by the motion track data) or just after an object leaves the image, or if an object is occluded or uncovered, views from other cameras which are observing the same general scene (such as the two cameras discussed with reference to FIGS. 16*a* and *b*) can be accessed automatically and/or manually so as to provide potential other views of the object at times when it is not visible on the first camera.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A video surveillance system comprising:
   two or more video cameras each providing a video signal, the cameras each being positioned at a respective known location; and
   circuitry configured to:
   detect image motion of an image feature within a first field of view of a first video camera of the two or more video cameras for deriving a corresponding physical motion of an object represented by the image feature;
   store data relating to a plurality of images of a plurality of the video signals from the two or more video cameras;
   derive the physical motion of the object with respect to a plurality of the known locations of the two or more video cameras;
   for forward prediction, derive a first expected time when the object may be observed in a second field of view of a second video camera of the two or more video cameras based on the derived physical motion and routing data defining possible routes from an observed location of the object in the first field of view to field of views of the two or more video cameras other than the first video camera; and
   display the images of the video signals from the second video camera stored in the circuitry at the first expected time, wherein
   for backward prediction, with respect to an image feature in an image under consideration, the circuitry is configured to derive the physical motion of the object prior to the object being observed in the image under consideration with respect to the plurality of the known locations of the two or more video cameras based on the plurality of images of the plurality of the video signals from the two or more video cameras stored in the circuitry, derive a second expected time before the time of the image under consideration when the object may have been observed in the second field of view of the second video camera, and access the plurality of images of the plurality of the video signals from the two or more video cameras stored in the circuitry within a threshold time of the derived second expected time.

2. The video surveillance system according to claim 1, wherein
   the circuitry is further configured to:
   derive the physical motion of the object after the object is observed in the image under consideration; and
   derive the first expected time after the time of the image under consideration when the object may be observed in the second field of view of the second video camera.

3. The video surveillance system according to claim 1, wherein
   when data relating to images of a video signal for the second video camera is stored in the circuitry in respect of the first expected time at which the object may have been observed in the second field of view of the second video camera, the circuitry detects a presence of the object in images captured by the second video camera within a threshold period of the first expected time.

4. The video surveillance system according to claim 1, wherein
   the routing data comprises map data defining possible routes from the observed location of the object to the field of view of the second video camera.

5. The video surveillance system according to claim 1, wherein
   the routing data defines transportation links for at least part of a journey between the observed location of the object and the second field of view of the second video camera.

6. The video surveillance system according to claim 5, wherein
   the routing data comprises data defining actual journey times by the transportation links.

7. The video surveillance system according to claim 1, wherein
   the routing data comprises speed data defining expected speed of the object between the observed location of the object and the second field of view of the second video camera.

8. The video surveillance system according to claim 1, wherein
   the circuitry is configured to store the routing data in association with images captured at times relevant to the routing data.

9. The video surveillance system according to claim 1, wherein
   the circuitry is configured to:
   detect a direction of the image motion of the object; and
   derive the first and second expected time based on the detected direction of the image motion.

10. The video surveillance system according to claim 1, wherein
    the circuitry is configured to detect whether the image feature represents:
    a person walking or running; or
    a vehicle.

11. A method of operation of a video surveillance system having two or more video cameras each providing a video signal, the cameras each being positioned at a respective known location; the method comprising:

detecting image motion of an image feature within a first field of view of a first video camera of the two or more video cameras for deriving a corresponding physical motion of an object represented by the image feature;

storing data relating to a plurality of images of a plurality of the video signals from the two or more video cameras;

deriving the physical motion of the object with respect to a plurality of the known locations of the two or more video cameras;

for forward prediction, deriving, using circuitry, a first expected time when the object may be observed in a second field of view of a second video camera of the two or more video cameras based on the derived physical motion and routing data defining possible routes from an observed location of the object in the first field of view to field of views of the two or more video cameras other than the first video camera; and displaying the images of the video signals from the second video camera stored in the circuitry at the first expected time, wherein for backward prediction, with respect to an image feature in an image under consideration, the method comprises deriving the physical motion of the object prior to the object being observed in the image under consideration with respect to the plurality of the known locations of the two or more video cameras based on the plurality of stored images of the plurality of the video signals from the two or more video cameras stored in the circuitry, deriving a second expected time before the time of the image under consideration when the object may have been observed in the second field of view of the second video camera, and accessing the plurality of images of the plurality of the video signals from the two or more video cameras stored in the circuitry within a threshold time of the derived second expected time.

12. A non-transitory computer readable medium including executable instructions, which when executed by a computer cause the computer to execute a method of operation of a video surveillance system having two or more video cameras each providing a video signal, the cameras each being positioned at a respective known location, the method comprising:

detecting image motion of an image feature within a first field of view of a first video camera of the two or more video cameras for deriving a corresponding physical motion of an object represented by the image feature;

storing data relating to a plurality of images of a plurality of the video signals from the two or more video cameras;

deriving the physical motion of the object with respect to a plurality of the known locations of the two or more video cameras;

for forward prediction, deriving a first expected time when the object may be observed in a second field of view of a second video camera of the two or more video cameras based on the derived physical motion and routing data defining possible routes from an observed location of the object in the first field of view to field of views of the two or more video cameras other than the first video camera; and displaying the images of the video signals from the second video camera stored in circuitry at the first expected time, wherein for backward prediction, with respect to an image feature in an image under consideration, the method comprises deriving the physical motion of the object prior to the object being observed in the image under consideration with respect to the plurality of the known locations of the two or more video cameras based on the plurality of stored images of the plurality of the video signals from the two or more video cameras stored in the circuitry, deriving a second expected time before the time of the image under consideration when the object may have been observed in the second field of view of the second video camera, and accessing the plurality of images of the plurality of the video signals from the two or more video cameras stored in the circuitry within a threshold time of the derived second expected time.

* * * * *